No. 880,677. PATENTED MAR. 3, 1908.
E. M. MARS.
DEVICE FOR THREADING CONDUITS AND FOR ANALOGOUS PURPOSES.
APPLICATION FILED JAN. 16, 1904.
2 SHEETS—SHEET 1.
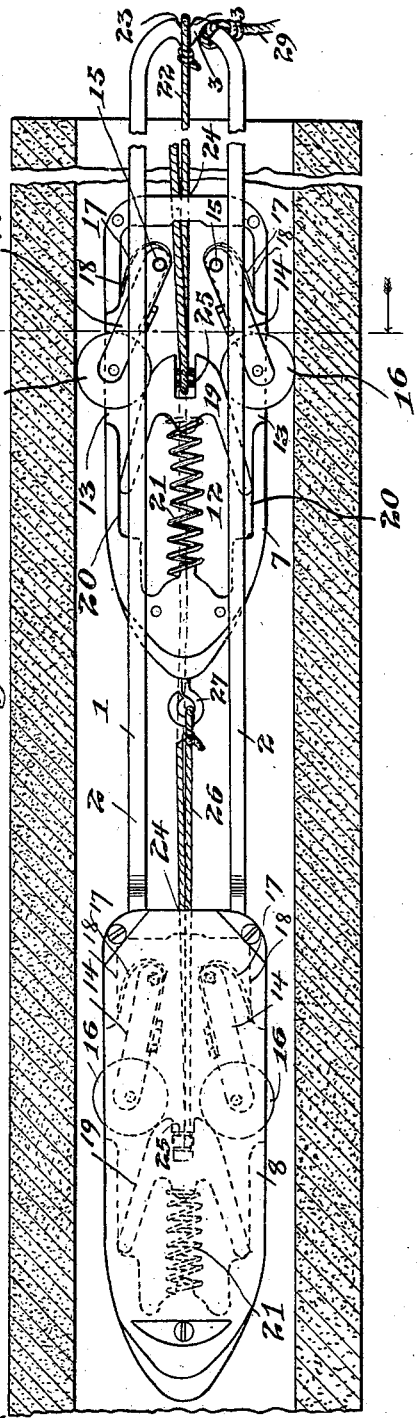
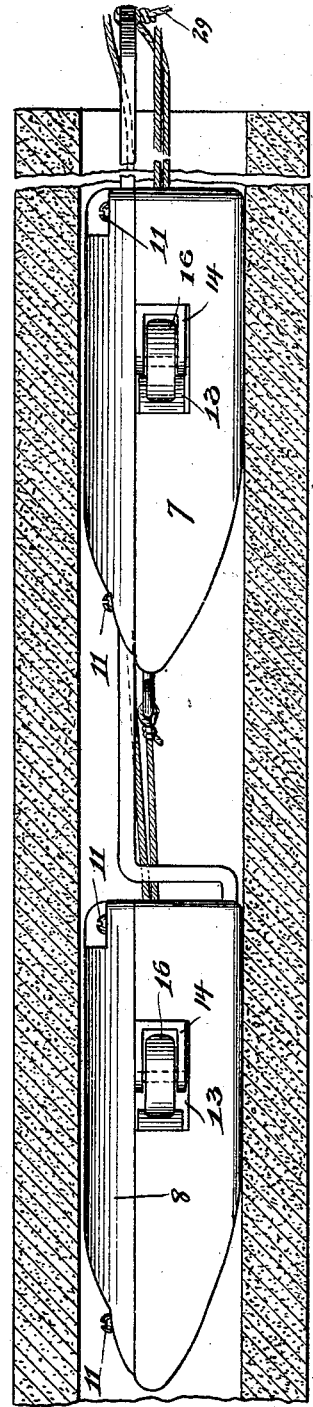

No. 880,677. PATENTED MAR. 3, 1908.
E. M. MARS.
DEVICE FOR THREADING CONDUITS AND FOR ANALOGOUS PURPOSES.
APPLICATION FILED JAN. 16, 1904.
2 SHEETS—SHEET 2.
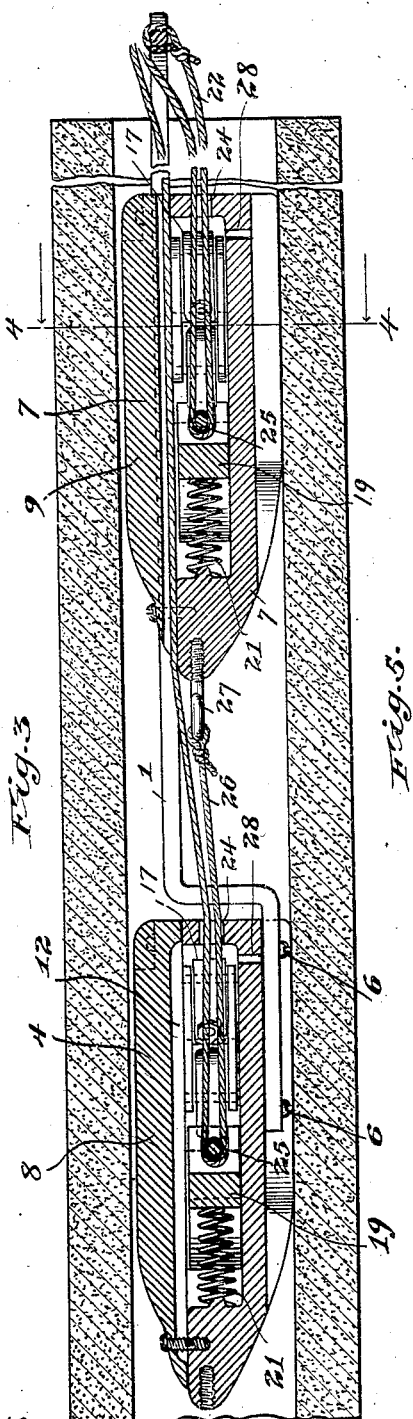
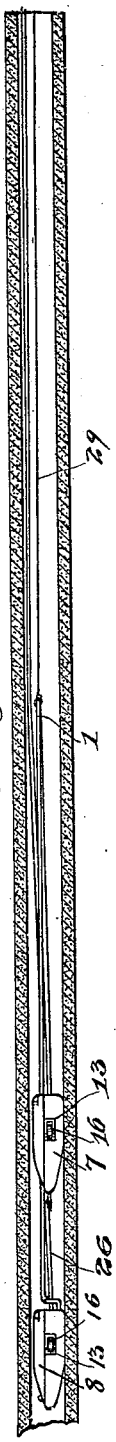
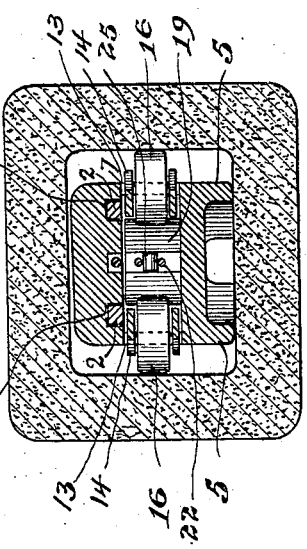
Witnesses:
Inventor,
Edward M. Mars
By Offield Towle Linthicum
Attys

UNITED STATES PATENT OFFICE.

EDWARD M. MARS, OF CHICAGO, ILLINOIS, ASSIGNOR OF ONE-HALF TO THOMAS H. MARS, OF CHICAGO, ILLINOIS.

DEVICE FOR THREADING CONDUITS AND FOR ANALOGOUS PURPOSES.

No. 880,677.          Specification of Letters Patent.          Patented March 3, 1908.

Application filed January 16, 1904. Serial No. 189,345.

*To all whom it may concern:*

Be it known that I, EDWARD M. MARS, a resident of Chicago, in the county of Cook and State of Illinois, have invented certain new and useful Improvements in Devices for Threading Conduits and for Analogous Purposes, of which the following is a specification.

This invention relates to an improved device for threading conduits and for analogous purposes, consisting, more specifically, of a traveler which may be caused to traverse a a conduit or other closed passage so as to draw therethrough a cable or the like.

Among the salient objects of the present invention are, to provide a device which may be inserted in one end of a closed passage, and by working a pair of operating cables connected therewith may be caused to traverse said passage to any reasonable length; to provide a device of such construction that it may be operated by means of a pair of flexible cables which are alternately pulled, the pulling of each cable operating to advance the threader a step, and at the same time to rewind or restore the other cable to a condition to be again pulled to advance the threader a second step, and so on; to provide a construction of such character that it will readily grip the interior walls of a smooth conduit and effectively advance itself and the connected cable; to provide a construction and arrangement of the mechanism that an increase of the load brought upon the device will result in an increase of the gripping power of the grippers, and thus insure effective operation of the device; to provide a construction which will adapt itself to irregularities of the internal walls of the conduit, will readily pass by slight obstructions, and will follow bends and deviations of the conduit which are not too abrupt; to provide a construction, the operation of which will not be interfered with by the presence of liquid or slime in the conduits; and in general, to provide a simple, convenient and effective device of the character referred to.

To the above ends the invention consists in the matters hereinafter described and more particularly pointed out in the appended claims, and the invention will be readily understood from the following description, reference being had to the accompanying drawings, in which—

Figure 1 is a horizontal, longitudinal, sectional view of a section of conduit with the threader therein, the cover member of the rear gripping device being removed to more clearly expose the construction of the parts therein; Fig. 2 is a longitudinal vertical sectional view of a section of conduit showing the threader in side elevation; Fig. 3 is a view similar to Fig. 2, the gripping devices of the threader being shown in longitudinal vertical section; Fig. 4 is a transverse sectional view through the conduit wall and one of the gripping devices; and Fig. 5 is a vertical longitudinal sectional view of a section of conduit and the conduit threader therein, the parts being shown of reduced scale so as to show a greater length of conduit and the full length of the threader therein.

Referring to the drawings, 1 designates as a whole a longitudinal frame support which is substantially rigid against endwise compression, but is desirably made flexible; said support in the present instance taking the form of a pair of spring metal bars 2—2 extending parallel throughout their main lengths and integrally united at their rear ends, as indicated at 3. Upon the forward ends of the bars 2 is mounted a gripping device designated as a whole 4; this gripping device having the general form of a pointed shoe conforming in general cross-sectional shape to the internal shape of the conduit. At its open bottom the gripping device is provided with runner-like extensions 5, 5, and the two supporting bars are deflected downwardly just in rear of the gripping device and extended below the under side of the gripping device and rigidly secured thereto, as indicated at 6 at points between the runners.

7 designates as a whole a second gripping device generally similar to that above described, but mounted to slide upon the bars 2. As a convenient construction each gripping device is provided with a removable top or cover member, as 8 and 9 respectively; the under or inner side of the latter cover member being longitudinally grooved throughout its length, as indicated at 10, to provide slideways for the bars 2 (see Fig. 4). The cover members are conveniently secured in position by means of screws inserted therethrough and threaded through the subjacent main body, as indicated at 11;

the heads of the screws being seated in recesses so as to be below the exterior surface of the gripping devices.

Within the body of each gripping device is formed a chamber 12 of peculiar internal configuration and each provided at laterally opposite points with openings, as 13, 13, through which project the grippers now to be described. In the preferred embodiment shown herein, the grippers consist of spring pressed arms 14, each pivotally mounted at its rear end, as indicated at 15, and extending thence forwardly and divergently outwardly; each arm carrying at its free end a gripping roller 16 which operates through the openings 13. Each gripper arm 14 is provided with a U-shaped spring, as 17, around its pivoted end, one arm thereof bearing against the inner wall of the chamber, as indicated at 18, in such manner as to tend to force the gripping rollers 16 inwardly and towards each other. The gripping rollers 16 are preferably of rubber, or rubber covered so as to effectively engage frictionally the side walls of the conduit.

In order to automatically thrust the grippers out into engagement with the walls of the conduit, a wedge 19 is mounted to slide longitudinally within the forward end of each chamber 12; said wedges having their narrow ends pointed rearwardly and working between parallel guide surfaces 20 formed by the inner side walls of the chamber. The tension of the spring pressed rollers pressing inwardly against the oblique sides of the wedges tend to force the latter forwardly at all times, but in order to assist in the forward movement of the wedges when released they are yieldably connected with the front ends of the shoes by means of coiled contractile springs 21.

Describing now the cable connections whereby the wedges are actuated and the grippers in turn thrown out to engage the conduit, 22 designates a cable connected at one end to the rear united ends of the bars 2, as indicated at 23, extending thence forwardly through a guide aperture 24 formed in the end wall of the rear gripping device, thence around an anti-friction roller or pulley 25 in the rear end of the wedge 19 of the rear gripping device, and thence extending back through the guide aperture 24 to the operator.

26 designates a second cable connected to a suitable hook or eye 27 upon the front end or point of the sliding gripping device, extending thence forwardly through the opening 24 of the forward gripping device, thence around the anti-friction roller 25 thereof, and back to the operator, as in the case of the cable 22.

In order to permit any water which may leak into the interior of the gripping devices during their passage through the flooded portions of the conduit to drain out, the bottom of each chamber is provided with one or more drain outlets, as indicated at 28.

The operation of the device is probably entirely obvious, but may be briefly described as follows: The device is started in the accessible end of the conduit, and the thread or cable to be threaded therethrough connected with the rear end of the frame support 1, as indicated at 29. Assuming that the two gripping devices are closed together when the device is started, the operator first pulls on the cable 22, thus drawing the wedge 19 thereof rearwardly and forcing the gripping rollers out into engagement with the sides of the conduit. The further movement of the wedge is thereupon arrested, and further drawing of the cable exerts a pull upon the supporting frame which is thereby caused to slide through the rear gripping device, carrying forward the front member. When the full length of the supporting frame has been thus moved forward, the operator releases the tension of the cable 22 and draws upon the cable 26, whereupon the forward pair of grippers are thrown out and engage the conduit, and a further pull of the cable slides the rear gripping device forwardly upon the supporting frame and until it is arrested by engagement with the forward shoe. These operations of pulling alternately first on one cable and then on the other obviously steps the device along the conduit, thus drawing the lead cable 29 throughout the length thereof.

It will be obvious from the foregoing that the only limit of distance to which the device may be sent is determined by the length to which the operating cables may be practically extended. It will be noted that the forward ends of the gripping devices or shoes are tapered, and this feature is important, especially as regards the advanced shoe, for the reason that vitrified conduits often contain projections or excrescences obstructing, or partially obstructing the bore of the conduit, and in such case the pointed shoe will break off the projections by a wedging action instead of by direct encounter, thus lessening the frictional engagement of grippers with the sides of the conduits necessary to remove the obstruction. Moreover, the pointing of the foremost shoe causes the latter to follow deviations of the bore readily.

While I have herein shown a preferred embodiment of my invention, yet it will be obvious that the construction may be modified without departing from the spirit of the invention, and I do not therefore limit myself to these details of construction except to the extent that they are made the subject of specific claims.

I claim as my invention:

1. A device for threading conduits comprising a head member, a follower, a frame connected with the head member and extending rearwardly, guides upon the follower engaging said frame and whereby the follower is caused to travel on the frame, a pair of gripper arms pivotally mounted in the head member, a wedge movably mounted in the head member in advance of and adapted to act between the gripper arms, a pair of gripper arms mounted in the follower head, a wedge member movably mounted in the follower member in advance of and adapted to act between the gripper arms thereof, springs tending to normally withdraw said wedges from between the gripper arms of the respective members, an operating cable connected with the rear portion of said frame, extended thence forwardly around a guide upon the wedge of the follower member and thence rearwardly, and a second operating cable connected with the follower member extended thence forwardly around the guide upon the wedge of the head member and thence returned rearwardly.

2. A conduit threading device comprising a two-part substantially closed head member provided with lateral openings and a shoe-shaped bottom, a pair of gripper arms having their rear ends pivotally mounted within said head member and extending thence forwardly and obliquely outward and carrying at their outer ends gripper rolls adapted to be projected through said lateral openings, a spring retracted wedge mounted in front of said gripper arms and adapted to move rearwardly between the latter, a guide frame connected with said head member and extending rearwardly therefrom, a follower member mounted to slide on said guide frame, a pair of gripper arms having their inner ends pivotally mounted in said follower member and extending thence forwardly and obliquely outwardly, gripper rolls carried by the outer ends of said gripper arms, a spring retracted wedge mounted in said follower member in advance of the gripper rolls thereof and adapted to be moved rearwardly between the latter, an operating cable connected with the rear end of said guide frame extended thence forwardly around an operating guide upon the wedge member of the follower member and thence returned rearwardly, a second operating cable connected with the forward end of the follower member extended thence forwardly around an operating guide upon the wedge of the head member and thence returned rearwardly whereby the follower member and head members may be alternately advanced by alternate operation of said cables, each wedge member operating to cause grippers engaged thereby to grip the interior of the conduit with a force proportionate to the resistance to advance encountered by the moving member of the device.

EDWARD M. MARS.

Witnesses:
ALBERT H. GRAVES,
L. F. McCREA.